US008764393B2

(12) United States Patent
Von Mutius et al.

(10) Patent No.: US 8,764,393 B2
(45) Date of Patent: Jul. 1, 2014

(54) METHOD FOR THE OPERATION OF A WIND POWER PLANT

(75) Inventors: Martin Von Mutius, Ascheffel (DE); Jens Altemark, Rendsburg (DE); Alf Trede, Immenstedt (DE)

(73) Assignee: Senvion SE, Hamburg (DE)

( * ) Notice: Subject to any disclaimer, the term of this patent is extended or adjusted under 35 U.S.C. 154(b) by 1119 days.

(21) Appl. No.: 12/663,718

(22) PCT Filed: Apr. 28, 2008

(86) PCT No.: PCT/EP2008/003427
§ 371 (c)(1),
(2), (4) Date: Dec. 9, 2009

(87) PCT Pub. No.: WO2008/151695
PCT Pub. Date: Dec. 18, 2008

(65) Prior Publication Data
US 2010/0183440 A1 Jul. 22, 2010

(30) Foreign Application Priority Data
Jun. 13, 2007 (DE) .......................... 10 2007 027 849

(51) Int. Cl.
*F03D 11/00* (2006.01)
(52) U.S. Cl.
USPC ........ 416/61; 416/1; 416/31; 416/36; 416/37; 416/41
(58) Field of Classification Search
USPC ............... 415/118; 416/1, 31, 36, 37, 41, 42, 416/44–53, 61
See application file for complete search history.

(56) References Cited

U.S. PATENT DOCUMENTS

| | | | | |
|---|---|---|---|---|
| 6,785,637 | B1 * | 8/2004 | Wobben | 702/188 |
| 6,876,099 | B2 * | 4/2005 | Wobben | 290/44 |
| 6,909,198 | B2 | 6/2005 | Ragwitz et al. | |
| 7,099,800 | B2 * | 8/2006 | Henriksen et al. | 702/187 |
| 7,231,282 | B2 | 6/2007 | Schubert et al. | |
| 7,318,154 | B2 * | 1/2008 | Tehee, Jr. | 713/155 |
| 7,677,869 | B2 * | 3/2010 | Martinez De Lizarduy Romo et al. | 416/37 |
| 2004/0151578 | A1 * | 8/2004 | Wobben | 415/4.1 |
| 2006/0033338 | A1 * | 2/2006 | Wilson | 290/44 |

FOREIGN PATENT DOCUMENTS

| | | |
|---|---|---|
| CN | 1882892 | 12/2006 |
| DE | 10033183 C2 | 1/2002 |
| DE | 20221562 U1 | 5/2006 |
| EP | 1519040 A1 | 3/2005 |

(Continued)

*Primary Examiner* — Christopher Verdier
(74) *Attorney, Agent, or Firm* — Rankin, Hill & Clark LLP

(57) ABSTRACT

A method for operating a wind power plant (WEA) before or during the performance of maintenance work on the wind power plant (WEA). At least one physical condition of the surroundings outside the wind power plant (WEA) induced by wind movement outside the wind power plant (WEA) is detected as an external physical condition. At least one physical condition of a component of the wind power plant (WEA) influenced by wind movement outside the wind power plant (WEA) is detected as an internal physical condition. The at least one external physical condition and/or at least one internal physical condition are evaluated. The at least one external physical condition is compared with a predetermined reference value for the external physical condition. The at least one internal physical condition is compared with a predetermined reference value for the internal physical condition. Depending on the comparison, at least one warning message is generated.

18 Claims, 1 Drawing Sheet

(56) References Cited

FOREIGN PATENT DOCUMENTS

| EP | 1531376 | | 5/2005 |
|---|---|---|---|
| EP | 1531376 | A1 | 5/2005 |
| EP | 1659287 | A2 | 5/2006 |
| WO | 03/029648 | | 4/2003 |
| WO | 2005/047999 | | 5/2005 |
| WO | 2005/111414 | | 11/2005 |
| WO | 2007/010322 | | 1/2007 |

* cited by examiner

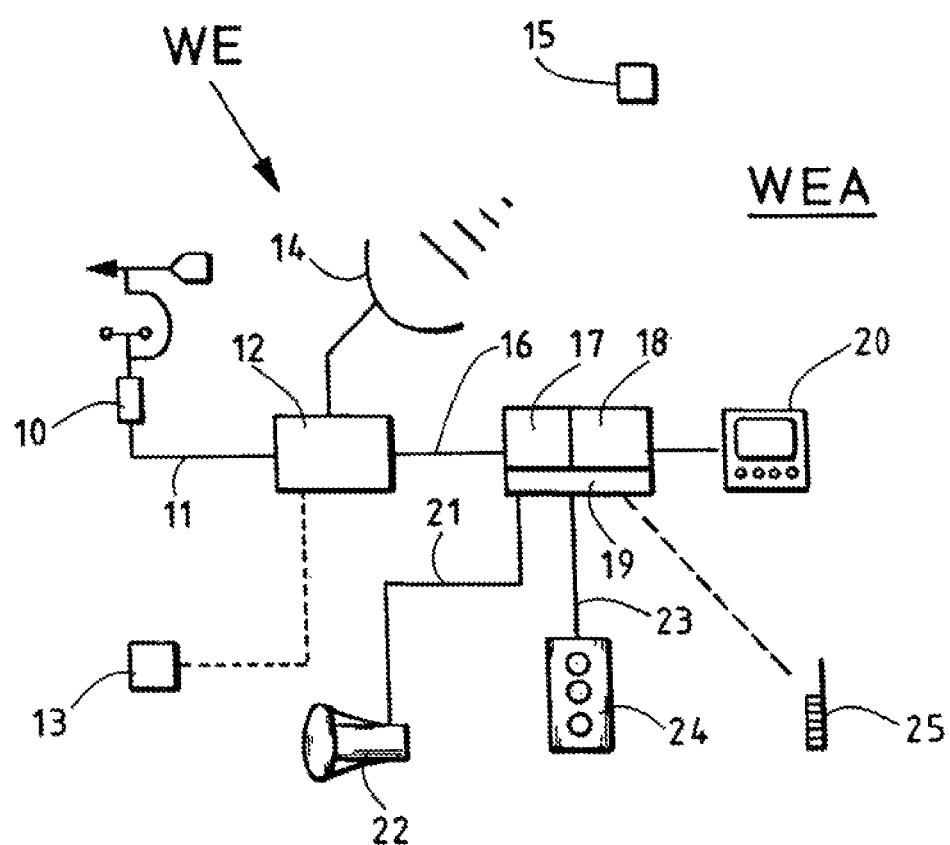

METHOD FOR THE OPERATION OF A WIND POWER PLANT

BACKGROUND OF THE INVENTION

1. Field of the Invention

The invention concerns a method for operating a wind power plant as well as a wind power plant. The invention further concerns a warning device or a warning system for a wind power plant as well as a use of the same.

Wind power plants of the patent applicant are known by the designation 5M, MM92, MM82, MM70 and MD77.

2. Description of Related Art

When performing maintenance and/or installation work on particular wind power plants, it is generally custom that this work must only be performed at wind speeds below limits, such as 8 m/s, 15 m/s or 25 m/s.

Moreover, for longer lasting maintenance measures, the assistance of weather services is used to be able to forecast the weather situation for the site at which maintenance will be performed. If, for example, squalls or strong winds are forecast in the corresponding region, the maintenance work is not performed or is aborted.

Based on this state of the art, the present invention has as its task facilitating the performance of maintenance work on a wind power plant for maintenance personnel, in which the safety of maintenance personnel and the safety of the wind power plant as well as its locking systems are to be increased.

BRIEF SUMMARY OF THE INVENTION

The task is solved by a method for operating a wind power plant, which is further developed in that, preferably before or during performance of maintenance work on the wind power plant,
- at least one physical condition of the surroundings outside the wind power plant induced by wind movement outside the wind power plant is detected as an external physical condition, and/or at least one physical condition of a component of the wind power plant influenced by wind movement outside the wind power plant is detected as an internal physical condition;
- the at least one external physical condition and/or at least one internal physical condition are evaluated;
- the at least one external physical condition is compared with a predetermined reference value for the external physical condition, and/or the at least one internal physical condition is compared with a predetermined reference value for the internal physical condition;
- depending on the comparison and
  a) when a predetermined limit value for the at least one external physical condition is exceeded and/or
  b) when a predetermined limit value for the at least one internal physical condition is exceeded
- at least one warning message is generated, in particular a maintenance warning message.

Up to now, before the start of longer maintenance tasks on a wind power plant for which a rotor lock or another locking device must be engaged, a weather forecast is obtained for a predicted maintenance period to ensure that the permitted wind conditions are not exceeded during the maintenance work. However, at higher wind velocities, the work must be stopped. During the maintenance work, the responsibility of one employee of a maintenance service currently consists here of watching the indications of control displays in order to decide based on rules of thumb when the allowable environmental conditions for performing maintenance have been exceeded. These rules of thumb are based on personal assessment and consequently a subjective interpretation by the employee.

In contrast to this, according to the invention, it is now envisaged that the environmental conditions at a wind power plant be detected by sensors at predetermined relevant measurement stations or locations before or during the performance of maintenance work.

Here, for example, the wind velocity and/or wind direction and/or wave motion of a body of water and/or wave frequency of a body of water and/or wave height of a body of water located near the wind power plant to be serviced or which surrounds the wind power plant are recorded as external physical conditions. These physical conditions produced by wind movement outside the wind power plant are environmental parameters which are directly associated with the wind movement.

In addition to that, within the scope of the invention it is conceivable that the physical condition of a component of the wind power plant, which is correspondingly influenced by the wind movement, is recorded as a parameter which is indirectly associated with the wind movement. For example, the displacement of the tower of a wind power plant or of a rotor blade as well as vibration or stress, in particular mechanical, etc. are recorded as internal physical conditions of the wind power plant or component.

Altogether, the invention increases the safety of maintenance personnel, because maintenance personnel are warned based on physically detectable and measurable environmental conditions and/or of components in order to terminate maintenance work in a timely manner.

In particular, the maintenance warning messages are warning messages which are appropriately focused on or transmitted to the maintenance personnel. Typical maintenance measures are, along with initial construction and commissioning, general service activities for components as well as the opening of hatches in operation rooms, in the tower, in the nacelle as well as in the spinner (rotor hub enclosure), the replacement of rotor blades or other large wind power plant components, maintenance of azimuth drives, blade angle adjustment systems, braking devices and the maintenance of plant parts outside the machine housing, such as the (wind) measurement sensors, lightning arrestor system, cleaning of rotor blades or towers, etc.

In particular with offshore wind power plants, access to the wind power plants is also among the service activities where safety is critical, because above a certain wave height (perhaps in combination with the direction of the waves) transfer from a ship is no longer possible, just as under very poor weather conditions no helicopter can deliver and/or pick up personnel.

The invention provides a method of monitoring which serves to protect maintenance personnel during the performance of maintenance work or activities.

Within the scope of the invention the term "reference value" is understood to refer to a set value for the corresponding external or internal physical condition. In addition to that, in a further embodiment, the reference value can also assume the value of the limit to avoid critical or supercritical conditions for maintenance personnel at the wind power plant.

For this, it is further envisaged that the displacement of the tower of the wind power plant and/or the displacement of the rotor blade of the wind power plant and/or the vibration of a component and/or the, in particular mechanical, load of a component of the wind power plant are detected as the internal physical condition.

According to a preferred embodiment, it is further envisaged that the external physical condition and/or the internal physical condition are detected and/or recorded for a predetermined period in each case.

The measurement of physical conditions ensues preferably with a sensor, while the recording of the measured physical conditions takes place in an evaluation unit by means of which the analysis of the measurement results is also performed.

In order to facilitate qualified statements about the change of the physical conditions produced by the wind movement, it is further envisaged that the measured external physical conditions are averaged to an average external condition value and/or the measured internal physical conditions are averaged to an average internal condition value. The parameter evaluation takes place hereby based on statistical methods, such as time averaging. Furthermore, this results in a warning message being generated if for a predetermined period, e.g. 10 minutes or 30 seconds, the average value lies continuously above the limit value and/or averaged limit value.

In addition to that, a further embodiment of the method provides that an acoustic and/or visual and/or mechanical warning signal, in particular a maintenance warning signal, is generated as a warning message, in particular maintenance warning message, in which in particular the maintenance warning signal is transmitted to maintenance personnel. This way a warning signal is given to a maintenance staff member in an audibly or visually or mechanically (vibration) perceivable manner. The maintenance warning signal is transmitted in particular to a preferably mobile end device.

In particular, warning messages with various warning stages and/or warning duration and/or warning intensities are generated dependent on the predetermined magnitude of deviations from the predetermined limit value. This way it is communicated to maintenance personnel at a first warning stage that a critical condition with a dangerous situation has been reached. If the second warning stage is triggered, then it is made clear to maintenance personnel at the wind power plant that a significantly more dangerous and/or supercritical situation is now present at the wind power plant. In a third stage it can then be communicated to maintenance personnel that there is a risk of severe injury or death for all persons as well as the risk of failure for the locking mechanism on the wind power plant.

Preferably, the warning message or warning messages will be transmitted to a mobile, in particular a portable, warning device, which maintenance personnel carry with them. In this regard it is conceivable that warning messages beside the visual and acoustic warning be transmitted to maintenance personnel, which communicate other warning signals that can be felt by maintenance personnel. For example, the palpable warning signals can be of a thermal or electrical nature. In addition to that, the warning message can be conveyed by increasing or lowering the humidity in a room or introducing scents or suchlike to the room in order to communicate to maintenance personnel that a potentially dangerous situation exists during maintenance.

Preferably, the external physical condition is detected by means of a sensor on the wind power plant and/or by means of a sensor spatially separated from the wind power plant. Within the scope of the invention, it is, for example, conceivable that the external physical conditions and/or environmental parameters are ascertained or determined by means of remote analyses in the form of weather radar or weather satellites. In this case, the analysis relevant to the deployment and comparison with limit values are performed in a remote monitoring center, for example, in order to communicate the warning message to maintenance personnel subsequently when the limit values are exceeded. Furthermore, it is envisaged in an embodiment that the measurement sensor is set up spatially separate from the wind power plant. Here, the measurement sensor is located, for example, on a wind measurement mast or is part of a weather radar or wave radar.

It is likewise envisaged in a larger (offshore) wind park that the measurement data of adjacent wind power plants will be accessed, especially for wind power plants which are in the wind direction in front of the wind power plant requiring maintenance and thus possible squalls are detected before they impact the wind power plant requiring maintenance.

In addition to that, the internal physical condition in particular is detected by means of a sensor on the component of the wind power plant. Corresponding sensors are known to the person skilled in the art, to determine vibrations or mechanical stresses of the component, for example.

The method is performed, in particular, before or during maintenance work on the wind power plant, preferably during a shutdown or during downtime of the wind power plant.

The method is furthermore distinguished in that during the evaluation of the at least one external physical condition and/or of the at least one internal physical condition, the length of time for a maintenance task to be performed on the wind power plant is taken into account. This way a forecast of the planned duration of maintenance activities is prepared during the analysis of the measurement signals in an evaluation unit. This forecast function also enables reliable estimates to be made of whether the maintenance measures should be continued at a (first) warning stage or aborted.

Moreover, it is envisaged in an embodiment that the predetermined limit value and/or predetermined reference value for the external physical condition are prespecified by a remote monitoring device and/or the predetermined limit value and/or predetermined reference value for the internal physical condition are prespecified by a remote monitoring device. As an alternative, maintenance personnel can determine the limit values at the plant itself.

The method is further distinguished in that for the external physical condition, simultaneous monitoring occurs for both the deviation of a first average value of the condition for a first predetermined period from a first predetermined reference value and the deviation of a second average value of the condition for a second predetermined period from a second predetermined reference value and/or that for the internal physical condition, simultaneous monitoring occurs for both the deviation of a first average value of the condition for a first predetermined period from a first predetermined reference value and the deviation of a second average value of the condition for a second predetermined period from a second predetermined reference value. Thus, the time trend of averages for both the internal and external physical condition is to be determined for various periods.

For example, the mean values for various periods, such as 10 minutes, 30 seconds and 3 seconds are monitored. This is a known method for effective monitoring by simple mathematical means of physical signals of a primarily random nature, on particular meteorological variables such as wind velocity, etc.

Furthermore, in a preferred embodiment, it is envisaged that when a limit value of an average of the external physical condition is exceeded, a first warning message, in particular a first maintenance warning message, is generated, and when both limit values of the external physical condition are exceeded a second warning message, in particular a second maintenance warning message, is generated.

A further embodiment of the method is distinguished in that when a limit value of an average of the internal physical condition is exceeded, a first warning message, in particular a first maintenance warning message, is generated, and when both limit values of the internal physical condition are exceeded, a second warning message, in particular a second maintenance warning message, is generated.

For example, the maintenance warning messages can be graded in the manner of a traffic light and/or signal light display, in which the signal color "GREEN" indicates maintenance is acceptable for the personnel due to favorable external conditions (for example, no wind or only light wind). With the signal color and/or signal limit "ORANGE", there is a potential hazard and with "RED", immediate danger for maintenance personnel.

The table below shows an example with wind velocity of how various limit values for different time averages generate different classification of warning messages in the form of a traffic signal.

The three limit values of a signal stage are linked here with a logical OR, i.e. the signal stage "YELLOW" is triggered for instance if the wind velocity is 15 m/s in the 10 minute average or 20 m/s in the 30 second average or 22 m/s in the 3 second average.

| | Signal limit values | | |
|---|---|---|---|
| | 10 minute limit value[m/s] | 30 s limit value [m/s] | 3 s limit value [m/s] |
| RED | 20 | 26 | 29 |
| YELLOW | 15 | 20 | 22 |
| GREEN | 12 | 16 | 18 |

The definition of limit values takes place with known calculation methods, such as using gust factors or simulation.

Furthermore, in a further embodiment of the method, meteorological data on the environment of the wind power plant are accordingly considered during the evaluation. This further improves the predictability of weather scenarios at the location of the maintenance message.

To increase the safety of maintenance personnel during the performance of maintenance work, it is further envisaged that an acoustic voice message or text message is generated as a warning message, in particular a maintenance warning message, by a warning device, said message then is transmitted via a loudspeaker on or in the wind power plant. Here, for example, corresponding warning messages are stored in a control unit of the wind power plant or a separate voice module. If a hazard for the maintenance personnel performing the maintenance work is found, a corresponding voice message is communicated acoustically to maintenance personnel over at least one loudspeaker.

Here the voice message is communicated in an appropriate national language or in an international language, such as English. Such a text warning can be, for example: "Wind too strong to enter the hub", "Leave the hub", "Please activate or insert the rotor lock first", "Please deactivate or remove the rotor lock first", "Please activate or switch on the yaw control first", "Please deactivate or switch off the yaw control first", "Please activate or switch on the blade angle adjustment first", "Please deactivate or switch off the blade angle adjustment first", "Please shut off the power to the control cabinet or subassembly first", "Close the hatch/cover/nacelle enclosure immediately", "Attention! Please leave the wind power plant immediately" or "Please leave the rotor hub/nacelle/tower/transformer station immediately" or "Attention! Rotor blades not in feathering position".

Moreover, within the scope of the invention, it is possible to convey appropriate status messages to maintenance personnel via the installed loudspeakers. In a further embodiment, corresponding maintenance instructions and/or work instructions can also be communicated acoustically to maintenance personnel. In a further embodiment here, the maintenance instruction can take place by or from a remote monitoring device using a SCADA system, such as that known to the patent owner by the designation "REguard". With a SCADA system as a general monitoring and data capture system for wind parks, corresponding data on wind power plants of a wind park are documented and/or the wind power plants are monitored accordingly and the operating behavior of the wind power plant in the wind parks is regulated.

Furthermore, within the scope of the invention it is also conceivable that a direct announcement to the on-site maintenance personnel occur via the loudspeakers from a remote monitoring center and/or control room. The measures cited are altogether suited to significantly increasing the safety of persons during the performance of maintenance work on a wind power plant.

Moreover, safety measures for maintenance personnel will continue to be improved in that the warning device will be or is activated by an actuating action or by entry of maintenance work to be performed, preferably specified maintenance work, preferably upon or during or before performing maintenance work on the wind power plant. This automatically activates a warning device as soon as maintenance work on the wind power plant is begun. This can take place, for example, by insertion of the rotor lock or the actuation of a service switch or the opening of a hatch, for example for access to the rotor hub. Furthermore, the activation of the warning device can occur based on an interactive action with the maintenance personnel on site. Here the warning device can be connected or linked to the controlling device of the wind power plant in such a way that only the maintenance work specified by entry at a corresponding input unit can be carried out and/or only maintenance measures specified by maintenance personnel can be carried out if these are reported and/or communicated by an active entry specifying the type and duration of the maintenance work.

Preferably, it can be provided thereby that after insertion of the rotor lock the hatch for access to the rotor hub can be opened only if maintenance personnel previously provided information to the warning device via the input unit on the anticipated duration and type of maintenance action.

The entry and/or the entered information on the type and duration of the work to be performed is therefore of importance, because, for instance, various limit values for generating a warning message can be present, depending on whether, for example, the rotor blades or the wind tracking angle of the nacelle on the tower must and/or can be adjusted during maintenance.

Furthermore, according to an embodiment, the warning device is preferably linked with the controlling device of the wind power plant in such a way that only the previously specified maintenance tasks can be performed, i.e. that moving the rotor blades or wind tracking and/or their deactivation is only possible if the maintenance measures to be performed and/or planned maintenance measures have actually been declared in advance.

Furthermore, an embodiment of the method is distinguished in that based on the entry or the category and/or depending on specified maintenance tasks, preferably via the type or duration of the maintenance work, the limit value for the at least one external physical condition and/or the limit value for the at least one internal physical condition are varied and/or determined for the generation of the warning message with various warning stages. This provides a corresponding safety level for the maintenance personnel, so maintenance personnel are not yet warned with a potential hazard during simple work, while this does occur with more comprehensive work.

It is further advantageous, if during the transmission of voice messages the volume of the loudspeaker or the loudspeakers of the wind power plant is adapted to the noise level of the environment of the loudspeaker(s), so it is ensured that the voice messages and/or voice output of the warning messages or maintenance instructions will be or is automatically adjusted to the ambient noise.

Moreover, it is preferred if the evaluation of the measurement data of the external and internal physical conditions is produced in a remote monitoring center taking into account regional forecasts for weather and wind, exact forecasts for the weather situation to be expected at the construction site of the wind power plant requiring maintenance are made. Corresponding information and/or data from external weather forecast devices can be given further consideration here. If, for example, squalls or strong winds are forecast in a corresponding region, the maintenance work will be aborted or not performed at all. Taking into account regional weather forecasts and taking into account local measurement data for the external physical conditions or the measured internal physical conditions on the wind power plant requiring maintenance, the corresponding warning messages will be generated and transmitted appropriately as required to maintenance personnel in the event of a safety hazard.

Here, it is conceivable within the scope of the invention that the analysis of the measurement data of the external and/or internal physical conditions can take place in the remote monitoring center with the aid of external weather forecast service providers such as the German weather service (Deutscher Wetterdienst, DWD) or other weather services, where the known possibilities of the wind and weather forecasts are considered in order to be able to make exact forecasts for the weather situation for the location of the wind power plant to be maintained, on which the maintenance work is performed. If, for example, squalls or strong winds are forecast in the corresponding region, the maintenance work is not performed or is aborted. Furthermore, here it is in particular conceivable to set up the function of the remote monitoring center directly with an external (weather forecast) service provider or to set up mixed forms, with which pre-evaluated data and statistics from the external service provider are transmitted to the remote monitoring center, which generates and/or transmits appropriate warning messages after evaluation of additional measurement data from the immediate vicinity of the wind power plant, taking into account the data of the external service provider.

The task is further solved by a wind power plant (WEA), which is further developed in that the wind power plant (WEA), preferably before or during the performance of maintenance work on the wind power plant (WEA) and furthermore preferably during a shutdown of the wind power plant (WEA), has a signaling device, and the signaling device receives and reports a warning message, in particular a maintenance warning message, from an evaluation unit. In the scope of the invention, the wind power plant is operated according to the method described above in the one or other variation.

In addition to that, within the scope of the invention an evaluation unit is also understood to include a sensor signal evaluation device by means of which sensor signals are evaluated from sensors which are provided on or in a wind power plant, in order to measure external and/or internal physical conditions for instance, so that based on the measured evaluation factors as well as a function of the evaluation factors, it is determined whether a corresponding warning message or acoustic voice message must be generated.

According to a preferred embodiment of the wind power plant, it is furthermore envisaged that the signaling device be formed in such a way that the signaling device receives and reports an acoustic voice message as a warning message.

A further solution of the task consists of a wind power plant being equipped with the following devices, preferably before or during the performance of maintenance work on the wind power plant: a sensor with which at least one physical condition of the environment outside of the wind power plant induced by wind movement outside of the wind power plant is detected as an external physical condition, and/or a sensor with which at least one physical condition of a component of the wind power plant which is influenced by the wind movement outside of the wind power plant is detected as an internal physical condition, an evaluation unit with which the at least one external physical condition and/or at least one internal physical condition are evaluated and with which the at least one external physical condition is compared with a predetermined reference value for the external physical condition and/or the at least one internal physical condition is compared with a predetermined reference value for the internal physical condition and, depending on the comparison and when a predetermined limit value for the at least one external physical condition is exceeded and/or when a predetermined limit value for the at least one internal physical condition is exceeded, at least one warning message is generated, and a signaling device, which receives and makes known the warning message, in particular maintenance warning message, from the evaluation unit.

Through the object of the invention, it is possible to provide a retrofittable signal unit and/or signaling device with a preferably standardized interface for connecting to an existing wind power plant controller. At least one environmental parameter on the wind power plant is monitored by the inventive wind power plant, in which the wind power plant includes a measurement value acquisition and evaluation unit and a signal unit which emits a signal if the environmental parameter exceeds a specifiable limit value. The measurement sensor can also be installed on the wind power plant here. Preferably, the measurement value acquisition and evaluation is part of an existing wind turbine controller, so that, accordingly, only a signal unit for contributing warning messages or suchlike is to be added or retrofitted.

Preferably, the wind power plant is operated according to the method described above; to avoid repetition, explicit reference is made to the previous exposition.

Furthermore, the task is solved by a warning device or a warning system of a wind power plant, in which the wind power plant is designed as described above.

In addition to that, the task is solved by the use of a warning device or by a use of a warning system in or on a wind power plant, in particular upon or during maintenance work on a wind power plant.

BRIEF DESCRIPTION OF THE DRAWINGS

The invention is described below, without restricting the general intent of the invention, based on an embodiment as an example; we expressly refer to the drawing with regard to the disclosure of all details according to the invention that are not explained in greater detail in the text. It shows:

FIG. 1 A schematic of the design of a warning device of a wind power plant.

DETAILED DESCRIPTION OF THE INVENTION

FIG. 1 is a schematic representation of a warning device WE for a wind power plant WEA not shown further. The wind movement and/or wind velocity and direction of the wind outside the wind power plant WEA are measured as an external physical condition of the environment using a sensor 10, for example in the form of a wind sensor, and passed via a cable 11 to a data recording device 12.

In a further embodiment, the data recording device 12, additionally or alternatively, also receives corresponding measurement data from another sensor 13, where internal physical conditions of a component of the wind power plant, which are caused by wind movement outside of the wind power plant WEA, are measured using sensor 13. This can, for example, be the direct measurement of stress experienced by a component such as a locking mechanism via suitable means of measurement, such as a strain gauge.

Additionally or alternatively, measurement data from a sensor 15 which is spatially separated from the wind power plant WEA is transmitted to the data recording device 12 via a receiving antenna 14. For example, the physical condition of a body of water in which the wind power plant is installed can be measured using the sensor 15. This includes the wave motion, the wave frequency and the wave height of the body of water.

Moreover, in an embodiment of the sensor 15, a weather satellite or weather radar or suchlike can be used, by means of which the external physical conditions at the wind power plant WEA are measured.

From the data recording device 12, the measurement data are transmitted via a connection cable 16 to an evaluation unit 17. The evaluation unit 17 furthermore has an input unit 18 and a signal unit 19. The input unit 18 is connected for this with an operating terminal 20 to specify corresponding limit values or reference values for the evaluation unit 17.

In a further advantageous embodiment, the units 12, 17, 18, 19, and 20 can also be collected in a single module or in an assembly.

In the evaluation unit 17, the values transmitted from the data recording unit 12 for the external and/or internal physical conditions are compared with a reference value and/or limit value; if the limit value for the corresponding physical condition is exceeded, a warning signal is transmitted by the signal unit 19 to maintenance personnel who perform maintenance measures on the wind power plant WEA.

For example, the signal unit 19 is connected via a cable 21 to an alarm horn 22 for this. In addition to that, in one embodiment, the signal unit 19 is connected via a cable 23 to a visual display 24, by means of which, for example, warning messages with various warning stages can be displayed, for example in the form of a traffic light indicator.

Furthermore, when a limit value is exceeded, signal unit 19 will transmit a warning message and/or a maintenance warning message to a mobile end device 25 which a maintenance staff member at the wind power plant WEA carries.

Within the scope of the invention, it is conceivable that several types of warning message can be combined with one another with dangerous wind speeds around the wind power plant.

Consequently, a warning system for maintenance work on a wind power plant is provided by the object of the invention, whereby the safety of maintenance personnel is significantly increased.

In order to avoid conversion expense with existing wind power plants (WEA), a particularly simple embodiment of the invention envisages only the provision of a signaling device on the wind power plant (WEA). This signaling device can also be implemented as mobile end devices 25 which at least two persons of the maintenance crew carry at all times. In the case of a voice message, the loudspeaker can be implemented in the form of an earphone or headset worn by personnel.

In this case, the remote monitoring center can access and evaluate the measurement data from the measurement sensors, such as the wind sensor 10, already present in a wind power plant, and in case a limit value is exceeded send out a warning message, in particular a maintenance warning message, to the mobile end devices 25 of the maintenance personnel.

Alternatively, the analysis of the measurement data can also take place in the controlling device already present on wind power plants, which is generally designed in such a way that in case of disturbances, corresponding incident messages are sent to mobile end devices. In this case, for retrofitting of the inventive signaling device 19 on an existing wind power plant WEA, for example, a software update is required, with which a software module is loaded which enables the execution of the method according to the invention.

Preferably, all components of the inventive device are implemented according to certified safety standards in order to meet all requirements of work safety for maintenance personnel. This can include, for example, redundant implementation of important system components.

| List of Reference Numbers | |
|---|---|
| 10 | Sensor |
| 11 | Cable |
| 12 | Data recording device |
| 13 | Sensor |
| 14 | Receiving antenna |
| 15 | Sensor |
| 16 | Connection cable |
| 17 | Evaluation unit |
| 18 | Input unit |
| 19 | Signal unit |
| 20 | Operating terminal |
| 21 | Cable |
| 22 | Alarm horn |
| 23 | Cable |
| 24 | Visual display |
| 25 | Mobile end device |
| WE | Warning device |
| WEA | Wind power plant |

The invention claimed is:

1. A method for operating a wind power plant (WEA), comprising the steps of:
   detecting at least one physical condition of the surroundings outside the wind power plant (WEA) induced by wind movement outside the wind power plant (WEA) as an external physical condition, or detecting at least one physical condition of a component of the wind power plant (WEA) influenced by wind movement outside the wind power plant (WEA) as an internal physical condition;
   evaluating the at least one external physical condition or at least one internal physical condition;

comparing the at least one external physical condition with a predetermined reference value for the external physical condition, or comparing the at least one internal physical condition with a predetermined reference value for the internal physical condition;

generating at least one maintenance warning message:
  a) when a predetermined limit value for the at least one external physical condition is exceeded or
  b) when a predetermined limit value for the at least one internal physical condition is exceeded, wherein the method is performed before or during maintenance work on the wind power plant (WEA) during downtime of the wind power plant (WEA).

2. A method according to claim 1,
wherein at least one of a wind velocity of the wind movement, a wind direction of the wind movement, a wave motion of a body of water, a wave frequency of a body of water, and a wave height of a body of water are detected as the external physical condition,
and
wherein at least one of a displacement of a tower of the wind power plant (WEA), a displacement of a rotor blade of the wind power plant (WEA), a vibration of a component of the wind power plant (WEA), and a load of a component of the wind power plant (WEA) are detected as the internal physical condition.

3. A method according to claim 1, wherein
at least one of the external physical condition and the internal physical condition is detected or recorded for a predetermined period, and
wherein the external physical conditions are averaged to an external average condition value or the recorded internal physical conditions are averaged to an internal average condition value.

4. A method according to claim 1, wherein at least one of an acoustic, visual, and mechanical maintenance warning signal is generated as the maintenance warning message and the maintenance warning signal is transmitted to maintenance personnel.

5. A method according to claim 1, wherein the at least one maintenance warning message is produced with various warning stages dependent on a predetermined magnitude of deviations from the predetermined limit value.

6. A method according to claim 1, wherein the maintenance warning message is transmitted to a mobile warning unit or a mobile, portable warning unit.

7. A method according to claim 6, wherein an acoustic voice message is generated as the maintenance warning message by a warning device, which is transmitted over a loudspeaker that is part of the wind power plant (WEA).

8. A method according to claim 7, wherein the warning device is activated by at least one of an actuating action, by entry of maintenance work to be performed, and by specified maintenance work to be performed.

9. A method according to claim 7,
wherein based on at least one of an entry of specified maintenance work, a category of the specified maintenance work, a type of the maintenance work, and a duration of the maintenance work, the limit value for at least one of the at least one external physical condition and the limit value for the at least one internal physical condition for generating the maintenance warning message with various warning stages are varied, and
wherein a volume of the loudspeaker of the wind power plant (WEA) is adapted to a volume of an environment of the loudspeaker.

10. A method according to claim 1,
wherein the external physical condition is detected by at least one of a sensor on the wind power plant (WEA) and a sensor separated spatially from the wind power plant (WEA) and
wherein during the evaluation, meteorological data on the environment of the wind power plant (WEA) is taken into account.

11. A method according to claim 1, wherein during the evaluation of the at least one external physical condition, or of the at least one internal physical condition, the length of time for a maintenance task to be performed on the wind power plant (WEA) is taken into account.

12. A method according to claim 1, wherein the predetermined limit value or predetermined reference value for the external physical condition are prespecified by a remote monitoring device or the predetermined limit value or predetermined reference value for the internal physical condition are prespecified by a remote monitoring device.

13. A method according to claim 1, wherein for the external physical condition simultaneous monitoring occurs for both a deviation of a first average value of the condition for a first predetermined period from a first predetermined reference value and a deviation of a second average value of the condition for a second predetermined period from a second predetermined reference value or that for the internal physical condition simultaneous monitoring occurs for both a deviation of a first average value of the condition for a first predetermined period from a first predetermined reference value and a deviation of a second average value of the condition for a second predetermined period from a second predetermined reference value.

14. A method according to claim 13,
wherein when a limit value of an average value of the external physical condition is exceeded, a first maintenance warning message of the external physical condition is generated, and when both limit values of the external physical condition are exceeded a second maintenance warning message of the external physical condition is generated, and
wherein when a limit value of an average value of the internal physical condition is exceeded a first maintenance warning message of the internal physical condition is generated, and when both limit values of the internal physical condition are exceeded a second maintenance warning message of the internal physical condition is generated.

15. A method according to claim 1, wherein the wind power plant (WEA) comprises a signaling device that receives and gives notice of the maintenance warning message from an evaluation unit.

16. A method according to claim 15, wherein before or during the performance of maintenance work on the wind power plant (WEA), the signaling device receives an acoustic voice message as the maintenance warning message and gives notice thereof.

17. A wind power plant (WEA), comprising:
at least one of:
  an external physical condition sensor that detects at least one physical condition that is induced by wind movement in an environment that is outside of the wind power plant (WEA), and
  an internal physical condition sensor that detects at least one physical condition of a component of the wind power plant (WEA) which is influenced by the wind movement outside of the wind power plant (WEA), an evaluation unit that evaluates at least one of the at least one external physical condition and the at least one internal physical condition, wherein the evaluation unit compares at least one of the at least one external physical condition with a predetermined reference value for the external physical condition and the at least one internal physical condition with a predetermined reference value for the internal physical condition and, and wherein depending on the comparison and when a predetermined limit value for the at least one external physical condition is exceeded or when a predetermined limit value for the at least one internal physical condition is exceeded, at least one maintenance warning message is generated, and a signaling device that broadcasts the maintenance warning message received from the evaluation unit, wherein the signaling device broadcasts the maintenance warning message before or during maintenance work on the wind power plant (WEA) during downtime of the wind power plant (WEA).

18. A wind power plant (WEA) according to claim 17, further comprising a warning system that is used during the maintenance work on the wind power plant (WEA).

* * * * *